(12) United States Patent
Miliziano et al.

(10) Patent No.: US 11,688,232 B2
(45) Date of Patent: Jun. 27, 2023

(54) METHOD FOR A GAMING SYSTEM

(71) Applicant: Play'n Go Marks Ltd, Sliema (MT)

(72) Inventors: Charlotte Miliziano, Sliema (MT); Zoltan Horvath, Sliema (MT)

(73) Assignee: Play'n Go Marks Ltd, Sliema (MT)

( * ) Notice: Subject to any disclaimer, the term of this patent is extended or adjusted under 35 U.S.C. 154(b) by 55 days.

(21) Appl. No.: 17/412,386

(22) Filed: Aug. 26, 2021

(65) Prior Publication Data
US 2022/0068083 A1  Mar. 3, 2022

(30) Foreign Application Priority Data

Aug. 27, 2020  (SE) .................................... 2050994-9

(51) Int. Cl.
*G07F 17/32* (2006.01)
*G06F 9/451* (2018.01)
*G07F 17/34* (2006.01)

(52) U.S. Cl.
CPC .......... *G07F 17/3223* (2013.01); *G06F 9/451* (2018.02); *G07F 17/3211* (2013.01); *G07F 17/34* (2013.01)

(58) Field of Classification Search
CPC .. G07F 17/3223; G07F 17/3211; G07F 17/34; G06F 9/451
See application file for complete search history.

(56) References Cited

U.S. PATENT DOCUMENTS

| | | |
|---|---|---|
| 2004/0166918 A1 | 8/2004 | Walker et al. |
| 2005/0101387 A1 | 5/2005 | Wolf |
| 2007/0060287 A1 | 3/2007 | Reddicks et al. |
| 2014/0329591 A1* | 11/2014 | Caputo ............... G07F 17/3258 463/29 |
| 2016/0019746 A1 | 1/2016 | Lyons et al. |
| 2018/0211477 A1 | 7/2018 | Matsumura |
| 2020/0090449 A1 | 3/2020 | Rajput et al. |

OTHER PUBLICATIONS

Extended European Search Report dated Jan. 26, 2022 for European Patent Application No. 21192585.4, 8 pages.
Swedish Search Report dated Apr. 29, 2021 for Swedish Patent Application No. 2050994-9, 2 pages.

* cited by examiner

*Primary Examiner* — Werner G Garner
(74) *Attorney, Agent, or Firm* — RMCK Law Group, PLC (57) ABSTRACT

The present disclosure relates to a computer implemented method performed by a gaming system. In particular, the present disclosure relates to a scheme for further improving a randomness in a game provided by means of the gaming system. The present disclosure also relates to a corresponding gaming system and a computer program product.

11 Claims, 5 Drawing Sheets

METHOD FOR A GAMING SYSTEM

CROSS-REFERENCE TO RELATED APPLICATIONS

This application claims priority to Swedish Patent Application No. 2050994-9, filed on Aug. 27, 2020. The disclosure of the above application is incorporated herein by reference in its entirety.

TECHNICAL FIELD

The present disclosure relates to a computer implemented method performed by a gaming system. In particular, the present disclosure relates to a scheme for further improving a randomness in a game provided by means of the gaming system. The present disclosure also relates to a corresponding gaming system and to a computer program product.

BACKGROUND

Games of chance are known and widely played for recreational purposes. The gaming industry has come to recognize that to sustain long term success it must be constantly innovative in introducing new games and new gaming concepts to the gaming public. One example of this innovating drive can be appreciated in the embrace of the Internet and online gaming by the gaming industry.

A common trend within the online gaming industry is to provide potentially new and current players with new means for attracting and ensuring that players remain at the online site, controlled by a gaming operator, providing the games. An example of such a means is the introduction of further unexpected scenarios in the game, potentially allowing a player to be further driven to play the game since the player has a desire to participate with the game in case of such an unexpected scenario appearing.

The introduction of possible unexpected scenarios in the game could also further increase the payout to the player, since the unexpected scenario possibly could add a further leverage to a bet placed by the player. Although this of course is of high interest to the player, such further possible payouts must be closely controlled by a gaming operator, ensuring that the payouts stay within desired boundaries. Thus, there is a general need to balance the attraction power of the game by means of possible further and higher payouts, while at the same time ensuring that an operator is in total control of the game.

SUMMARY

According to an aspect of the present disclosure, the above is at least partly met by a computer implemented method performed by a gaming system, the gaming system comprising a server arranged in communication with an electronic user device using a network connection, the electronic user device comprising a display screen, wherein the method comprises the steps of forming, at the server, a table having a predetermined dimension and comprising a corresponding number of cells, generating, at the server, a first set of elements corresponding to the cells of the table, populating, at the server, the cells of the table with the first set of elements, directing, using the server, the electronic user device to display the table at the display screen, identifying, at the server, a cluster of cells of the table being populated with matching elements, determining, at the server, a first gaming outcome by applying a predefined matching scheme to match the identified cluster with a plurality of predefined cluster formations, controlling, using the server, the electronic user device to display the gaming outcome at the display screen, identifying, at the server, further matching elements within the table, updating, at the server, positions of the table where the matching elements of the cluster and the further matching elements are located with a second set of elements generated at the server, and in response to the second set of elements being introduced in the table directing, using the server, the electronic user device to display the updated table.

Generally, when the operational scheme according to the present disclosure is applied to a game concept provided by the server, it may be possible to increase the randomization of the game, thus potentially allowing for increasing winning possibilities for a player participating in the game. An advantage following such a possibility is an improved attraction power to the game, thus potentially allowing for the player to remain playing the game for an increased duration as compared to previously known similar operational schemes. This could potentially be beneficial to both the player participating in the game and the gaming operator providing the game.

Additionally, allowing for an increased randomization of the game may potentially further increase the security of the game, since known general computer-based issues relating to the generation of randomized material to the game are minimized.

In accordance to the present disclosure, at least a portion of the gaming concept where the player is interacting involves engaging with a table comprising a plurality of cells, where the cells are arranged in lines and columns and where each of the cells is populated with an element. Such elements may for example include different types of elements, for example including numbers and/or symbols of any kind and matching a desired implementation of the game to be played by the player.

According to the present disclosure, if the server identifies that the elements of the tables are arranged in such a manner that a predetermined number of adjacent cells comprise matching elements, then this identified "cluster of elements" are matched with a plurality of predefined cluster formations. In case a match is found, the server determines a first gaming outcome. In some embodiments at least five cells must comprise matching elements. It may however be possible to set this number both higher and lower and still stay within the boundaries of the present disclosure.

Possibly, a cluster may be determined as "identified" id e.g. at least a predetermined number of cells comprising matching elements are located adjacently to each other. The predetermined number of cells may for example be five, however this predefined number may also be lower or higher. The definition of "adjacently" may be dependent on the specific implementation of the present scheme. For example, adjacently may be defined as arranged on the same row of the table or in the same column of the table. It may however also be possible to allow other cluster formations to be seen as adjacently, such for example comprising a combination of cells arranged both on different columns and on different rows, but at least sharing a side of a cell to another cell holding a matching element. Other definitions of clusters comprising matching elements are of course possible and within the scope of the present disclosure. Such a further example of a cluster may be where matching elements form specific "shapes", but not necessarily share a cell side with each other. Thus, two adjacent cells may possibly, in some embodiments, be seen as two cells at least having "touching" cell corners.

For ensuring that the matching is performed with a minimum amount of perceived delay in the progression of the game it is desirable to apply a computational efficient predefined matching scheme. Possible schemes that can be used in relation to the present disclosure include different forms of feature detection algorithms that today find usage within e.g. the computer vision field, such as for detecting and describing local features in images. In some embodiments of the present disclosure the predefined matching scheme may be selected to apply e.g. feature descriptors or feature vectors, where the plurality of predefined cluster formations are expressions of such feature descriptors or feature vectors. Other predefined matching schemes are also possible and within the scope of the present disclosure. In some embodiments, the plurality of predefined cluster formations generate different gaming outcomes, where potentially in comparison more "complex" clusters comprising specifically "unusual" elements may generate a different gaming outcome as compared to a less complex cluster comprising "common" elements.

Following the determination of the first gaming outcome, the server finds further matching elements within the table. Accordingly, if the cluster as an example comprises five elements of the same type, such as a "cherry", then also further cherries comprised with the table and being outside of the cluster are identified.

These further matching elements and the elements of the identified cluster are then "exchanged" for a new set of elements (above defined as a second set of elements). In case the table has been updated with the new set of elements, the server will direct the electronic user device to display the updated table. The server will as such function in a reactive manner and only direct the electronic user device to display the updated table if new elements have been introduced in the table. This ensures that the game is progressing as effectively as possible and with a reduced computational load placed on the server, the network and the electronic user device.

In a possible embodiment of the present disclosure, the new elements are formed in an automatic manner, meaning that the player must not necessarily interact with the server for the automatic formation of the new set of elements.

When the new set of elements successfully has populated the table, the scheme according to the present disclosure is progressed by again identifying further clusters of cells comprising matching elements. In a similar manner as discussed above, the server may then determine a further gaming outcome (a second gaming outcome), in case a specific type of cluster has been identified. Accordingly, the player may potentially be assigned not only a single gaming outcome but a second or even further gaming outcomes, in case the scheme according to the present disclosure iteratively progresses as discussed above. In some embodiments the iterative process may be limited to a predefined number of iterations (such as two-five iterations), however in some other embodiments the server could potentially allow for an unlimited number of iterations.

In some embodiments the new set of elements are directly position at the "missing cells". However, the table may as an alternative "collapse", meaning that for example the missing cells are populated with elements located further up in the same column (by applying "virtual gravity" to each column). The new cells may then be positioned "at the top" of the table at the relevant columns to ensure that each of the cells of the table in the end is populated with an element. The concept of populating the table with the new set of elements will be further elaborated below in the detailed description of the present disclosure.

To even further increase the randomness of the game, it may in some embodiments be possible to introduce at least one generic element type, in some embodiments defined as a wild card or a joker element. Such a generic element type is in accordance to the present disclosure matchable to all of the plurality of predefined element types. As such, the generic element type may be equally matchable with e.g. number as well as a symbol.

The controllability of the scheme may in some embodiments allow for the operator of the server to dictate that the update of the table including the exchange of both the matching elements and further matching elements is only performed in case at least one generic element type is comprised within the identified cluster.

In some embodiments of the present disclosure the first game is a game of chance, such as for example a slot game, where the player is placing a bet to be allowed to participate in the game. The gaming outcome may in such an embodiment be dependent on the bet placed by the player.

The concept according to the present disclosure may however be applied to other types of games, including e.g. sports bet or similar, where the gaming outcome generated by means of the present scheme may be used for e.g. allowing the player to increase a total outcome generated by e.g. a sports bet.

As indicated above, the server is in charge of controlling the electronic user device to display the table as well as the gaming outcome at the display screen of the electronic user device. In some embodiments the electronic user device is adapted to present a graphical user interface (GUI) at the display screen. The server may in a corresponding manner be adapted to a graphical representation of at least one of the table, the gaming outcome and the updated table, to be distributed to the electronic user device, where the graphical representation is then presented within the GUI.

Such a GUI may also be arranged to allow the player to directly interact with the server, for example allowing the player to control his/her participation in the game as well as to control a size of the bet placed when participating in the game.

Within the context of the present disclosure the expression "forming a graphical representation" should be interpreted broadly. Specifically, it should be understood that the server in some embodiment may be configured to only form a collection of "meta-data" (here corresponding to the graphical representation) that will be rendered at the frontend, such as within the GUI of the electronic user device. However, in another embodiment it may be the other way around, meaning that the server will essentially form an image (here corresponding to the graphical representation) that then will be displayed within the GUI of the electronic user device. Further alternative implementations along the same mutations are possible and within the scope of the present disclosure. Additionally, it may also be possible to allow the graphical representation to be set differently for different game operators, players or groups of players. The graphical representation may also be dependent on e.g. the geographical location of the players, such as dependent on city, country or continent where the player is located/registered.

Within the context of the present disclosure it should be understood that it in some embodiments so that it may be possible to allow the server to control if a specific electronic user device is to be allowed to apply the scheme according to the present disclosure. Such control may for example be dependent on a geographical location of the electronic user device. Possibly, the geographical location may be selected from a group comprising a city, a country and a continent.

According to another aspect of the present disclosure there is provided a gaming system comprising a server arranged in communication with an electronic user device using a network connection, the electronic user device comprising a display screen, wherein the server is adapted to form a table having a predetermined dimension and comprising a corresponding number of cells, generate a first set of elements corresponding to the cells of the table, populate the cells of the table with the first set of elements, direct the electronic user device to display the table at the display screen, identify a cluster of cells of the table being populated with matching elements, determine a first gaming outcome by applying a predefined matching scheme to match the identified cluster with a plurality of predefined cluster formations, direct the electronic user device to display the gaming outcome at the display screen, identify further matching elements within the table, update positions of the table where the matching elements of the cluster and the further matching elements are located with a second set of elements generated at the server, and in response to the second set of elements being introduced in the table direct the electronic user device to display the updated table. This aspect of the present disclosure provides similar advantages and embodiments as discussed above in relation to the previous aspects of the present disclosure.

Preferably, the gaming system is a cloud-based computing system and the server is a cloud server. Thus, the computing power provided by means of the invention may be distributed between a plurality of servers, and the location of the servers must not be explicitly defined. Advantageous following the use of a cloud-based solution is also the inherent redundancy achieved.

In some embodiments the electronic user devices may be selected to include e.g. a computer (laptop/stationary), a mobile phone, a tablet, a (gaming) consoles or any other gaming device and gambling terminals. The GUI may in some embodiments be allowed to depend on the type of electronic user device.

According to a still further aspect of the present disclosure there is provided a computer program product comprising a computer readable medium having stored thereon computer program means for operating a gaming system, the gaming system comprising a server arranged in communication with an electronic user device using a network connection, the electronic user device comprising a display screen, wherein the computer program product comprises code for forming, at the server, a table having a predetermined dimension and comprising a corresponding number of cells, code for generating, at the server, a first set of elements corresponding to the cells of the table, code for populating, at the server, the cells of the table with the first set of elements, code for directing, using the server, the electronic user device to display the table at the display screen, code for identifying, at the server, a cluster of cells of the table being populated with matching elements, code for determining, at the server, a first gaming outcome by applying a predefined matching scheme to match the identified cluster with a plurality of predefined cluster formations, code for directing, using the server, the electronic user device to display the gaming outcome at the display screen, code for identifying, at the server, further matching elements within the table, code for updating, at the server, positions of the table where the matching elements of the cluster and the further matching elements are located with a second set of elements generated at the server, and code for in response to the second set of elements being introduced in the table directing, using the server, the electronic user device to display the updated table. Also this aspect of the present disclosure provides similar advantages and embodiments as discussed above in relation to the previous aspects of the present disclosure.

The computer program product is typically executed using a computing device comprised with the server, preferably including a microprocessor or any other type of computing device. Similarly, a software executed by the server for operating the gaming system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art. Accordingly, operation of the gaming system may be at least partly automated, implemented as e.g. software, hardware and a combination thereof.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawing, in which.

DETAILED DESCRIPTION

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness to fully convey the scope of the present disclosure to the skilled addressee. Like reference characters refer to like elements throughout.

Figure 1:
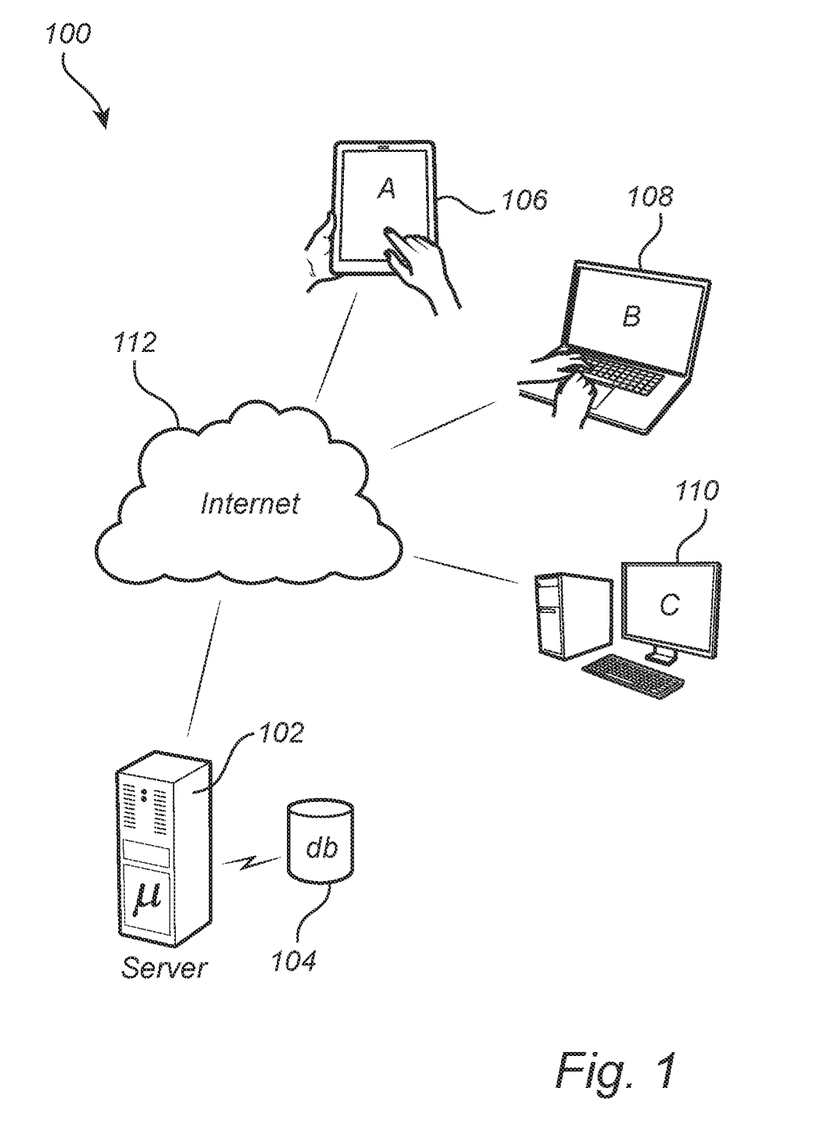
FIG. 1 illustrates an exemplary gaming system according to a currently preferred embodiment of the present disclosure.

Referring now to the drawings and to FIG. 1 in particular, there is depicted a gaming system 100 in which an online game, such as a slot game, may be played according to a currently preferred embodiment of the present disclosure. The system architecture illustrated in FIG. 1 depicts a system environment in which systems, methods, apparatus, computer-readable mediums and data structures consistent with the principles of some embodiments of the present disclosure may be included. It may be appreciated that the components of system 100 may be implemented through any suitable combinations of hardware, software, and/or firmware.

As shown in FIG. 1, system 100 includes at least one server 102 and/or at least one gaming database 104. Server 102 and gaming database 104 may be communicably linked to a plurality of electronic user devices in the form of electronic user devices, such as client devices 106, 108, 110, etc. through network 112. The network 112 may be wired or wireless, including for example wired connections like a building LAN, a WAN, an Ethernet network, an IP network, etc., and wireless connections like WLAN, CDMA, GSM, GPRS, 3G mobile communications, 4G mobile communications, Bluetooth, infrared, or similar. As such, the network 112 may be locally and/or globally provided.

The gaming database 104 may be any type of physical unit on which games reside, such as a machine in a gaming venue, a lottery machine, an electronic game system, etc. Network 112 may be implemented as the Internet, or any local or wide area network, either public or private. Network 112 may also be a hardware system physically connecting some or all of the server 102 and client devices 106, 108, 110. Client devices 106, 108, 110, typically each operated by a player, may be implemented as any computing devices such as a personal computing device, a server, a server network, handheld computing device, slot machine, other gaming machine in a gaming venue such as a betting terminal, a gaming console, lottery machine, an interface in a virtual environment, etc.

It may be appreciated by one of ordinary skill in the art that while only one server, one gaming database, one network and two client devices are depicted, more or fewer servers, more or fewer gaming databases, more networks and more or fewer client devices and/or other devices may reside within system 100.

The elements inside system 100 may include one or more (micro) processors, purpose-built hardware such as, for example, FPGA, ASIC, etc., software systems and applications, software packages, mechanical and electrical parts, etc. Software packages that may be part of server 102, gaming database 104, client devices 106, 108, 110 and network 112 may be recorded on a computer readable medium such as a memory device, RAM, CD/DVD/USB drives, handheld memory device, etc., and/or may be part of a physical device such as one or more (microprocessors or electro-mechanical systems. Any of server 102, gaming database 104, client devices 106, 108, 110, network 112 and further electronic user device 114 may be fixed systems, mobile systems, portable systems, or cloud systems (as discussed above). FIG. 1 shows only three electronic user devices 106, 108, 110, however it should be understood that a general implementation of the present disclosure comprises a large plurality of electronic user devices, possibly greatly above three, such as 100, 1000, 10000, etc.

Although the various components of FIG. 1 are illustrated as discrete elements, it should be recognized that certain operations of some of the various components may be performed by the same physical device, e.g., by one or more microprocessors or other type of devices.

Figure 2:
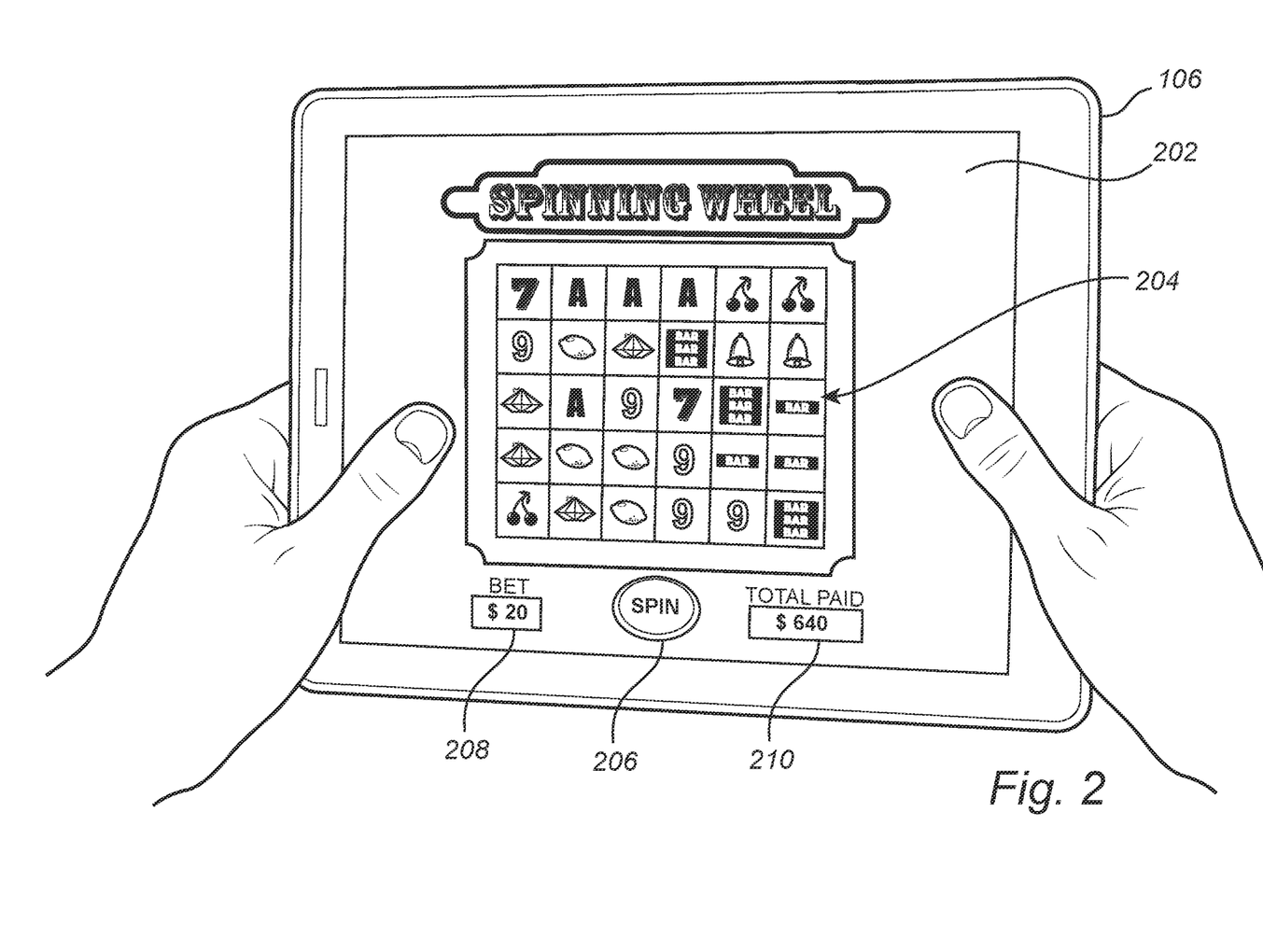
FIG. 2 provides an exemplary illustration of a typical graphical user interface (GUI) for use in playing a game.

Turning now to FIG. 2 illustrating a graphical user interface (GUI) 202 to be displayed at a client device, such as any of the client devices 106, 108, 110, in the illustrated embodiment provided as an application ("app") or within e.g. a web browser of the portable client device 106 being a tablet. The game to be played at the client device 106 is here shown as an online game of chance in the form of a slot game, visualized within the GUI 202 as comprising a table comprising six individual reels 204 arranged in columns and provided with a plurality of different symbols. The table also comprises five rows. As such, the predefined dimension of the table as shown in FIG. 2 is six times five, thus comprising 30 cells in total.

The GUI also comprises a "button" 206 to start the game, here provided with the description "SPIN" for initiating a turn of the game. In addition, the GUI 202 comprises an indicator of the current bet 208 (i.e. payment for each turn of the game) and an indicator of the total payment to the player 210. It should in any case be understood that other types of games may be played within the scope of the present disclosure, for example being skill based as compared to a game of chance.

Figure 3A:
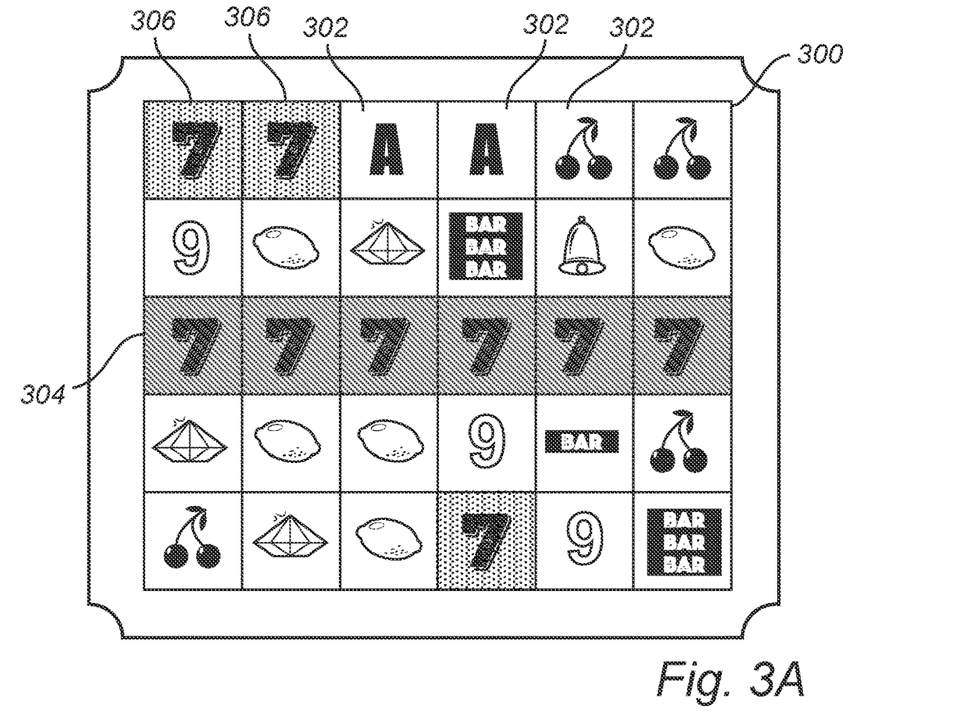
FIGS. 3A-3D present exemplary illustrations of operations of different tables according to different embodiments of the present disclosure.
Figure 3B:
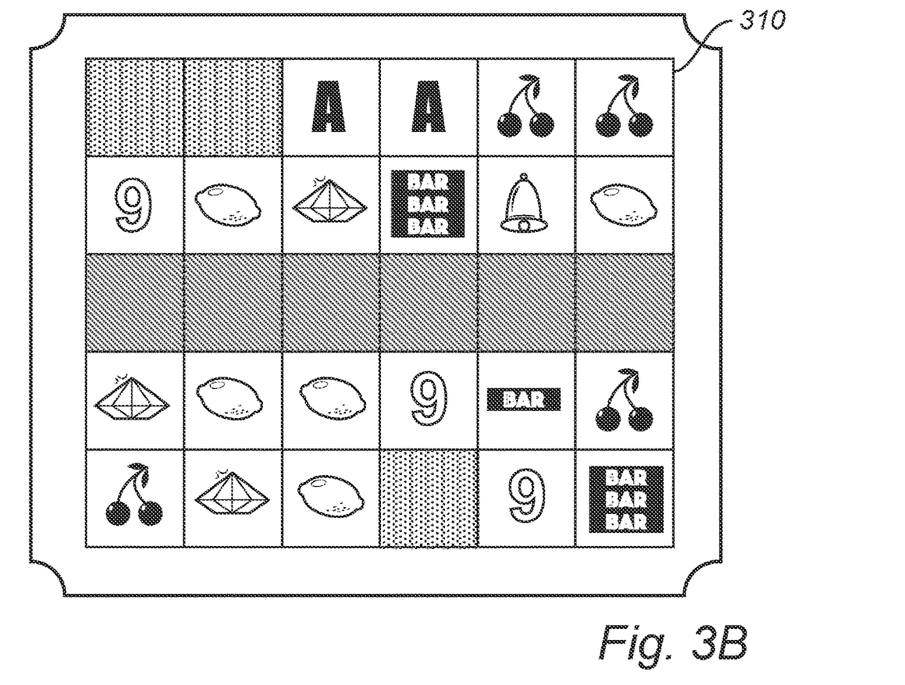
Figure 3C:
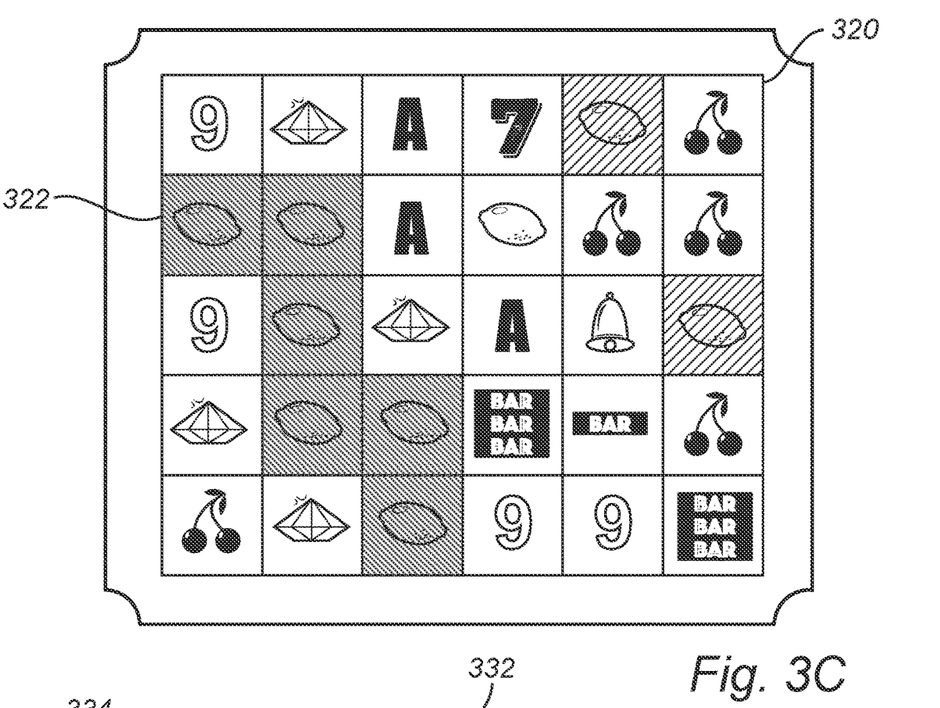
Figure 3D:
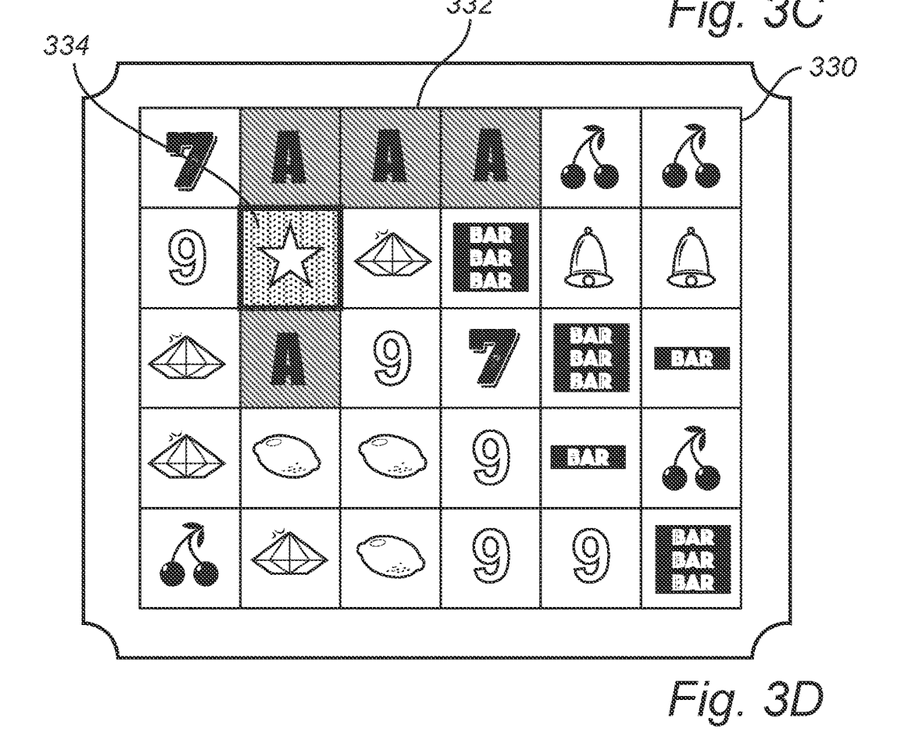
Figure 4:
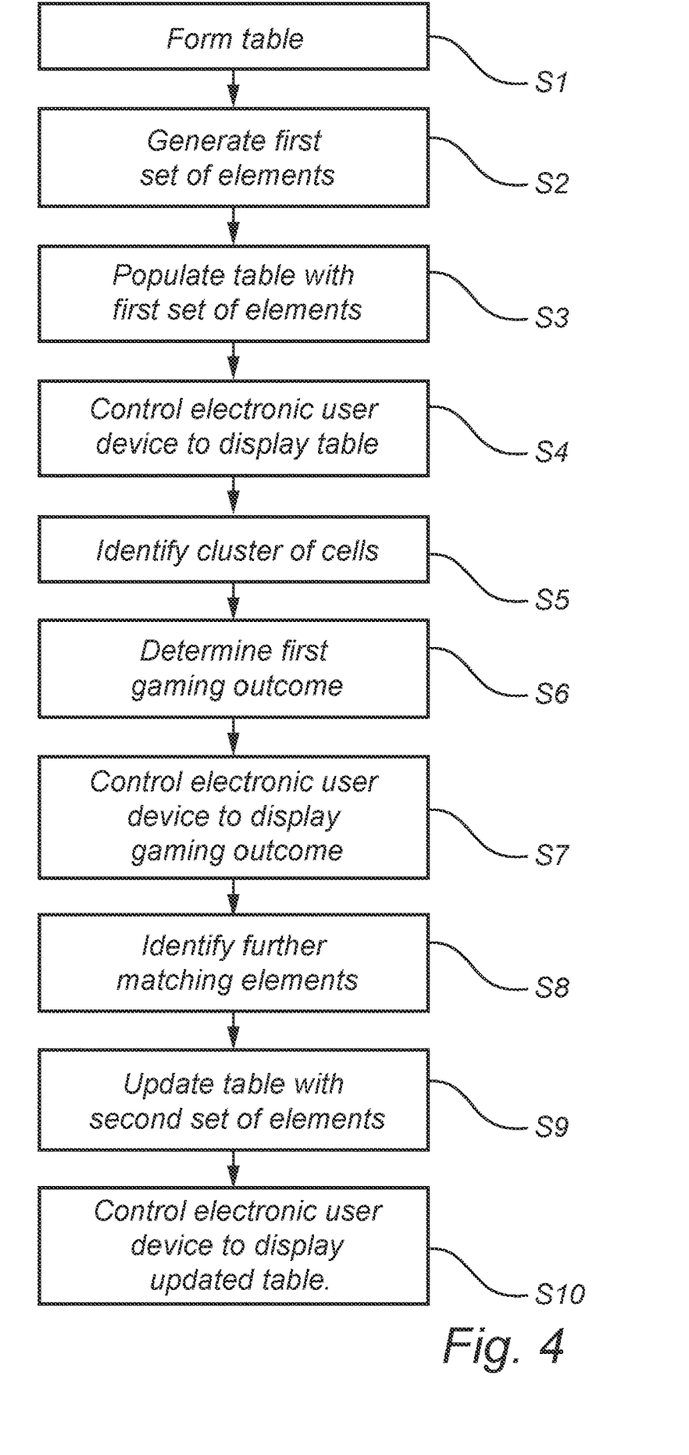
FIG. 4 is a flow chart illustrating the exemplary steps for operating the gaming system as shown in FIG. 1.

Turning now to FIGS. 3A-3D in conjunction with FIG. 4, illustrating different tables according to different embodiments of the present disclosure. In FIG. 3A there is first shown an initial table 300 comprising a plurality of cells 302 arranged in rows and columns, corresponding to the table as shown in FIG. 2, e.g. displayable at a display screen of any of the client devices 106, 108, 110.

As is exemplified in FIG. 3A, in a mid-row of the table 300 there has been formed, S1, a cluster of elements by the server 102. The server 102 has furthermore generated, S2, a first set of elements, where the elements have been arranged to populate, S3, the table 300. The server 102 has then controlled, S4, e.g. client device 106 to display the populated table 300. In case the game is a game of chance, the elements may be at least semi-randomly generated and similarly the positioning of the elements within the table 300 may be semi-randomly selected.

When the element populated table 300 is in place, the server performs an automated process of identifying, S5, a cluster 304 of matching elements within the table 300. In FIG. 3A, the matching elements are shown as being the number "7". Different elements are also shown in FIG. 3A, corresponding to the "normal" type of elements shown in relation to a slot game.

As discussed above, the definition of a cluster may be different depending on the implementation of the present scheme. In FIG. 3A, a cluster is however "identified" only in case at least a predefined number of elements are arranged adjacently to each other. In the embodiment as shown in FIG. 3A, this predefined number has been set to five. This predefined number may of course be set higher and/or lower.

As discussed above, in case a cluster 304 has been identified, the server 102 may determine, S6, a first gaming outcome. The gaming outcome may in some embodiments be dependent on the elements comprised with the cluster. As such, a cluster comprising "unusual" elements may generate a gaming outcome that is perceived by the player as more valuable/desirable as compared to a situation where the cluster comprises more "common" elements. The operator of the game may be allowed to select what elements are to be considered as unusual and as common.

It may in some embodiments also be possible to allow the gaming outcome to be e.g. dependent on the bet placed by the player. As such, an in comparison higher bet placed by the player may generate a higher gaming outcome as compared to if the player placed a lower bet.

Once the server 102 has determined the gaming outcome, the server will proceed to control, S7, the client device 106 to display the gaming outcome. As such, the player will typically be informed within the display screen of the client device 106 what was "won" due to the identification of a specific type of cluster of elements.

In line with the present disclosure the sever 102 will however proceed with identifying, S8, further matching elements 306 within the table 300. According, as is shown in FIG. 3A, three further cells comprise the element "7". In accordance to the present disclosure the server 102 will then generate a corresponding number of new elements, defined as a second set of elements.

In FIG. 3B a slightly different table 310 is shown, where all the cells previously comprising the element "7" are now empty and are to be populated with the newly generated elements.

In one embodiment of the present disclosure and as shown in FIG. 3C, the empty cells are populated by the server 102 applying a "gravity functionality", meaning that the empty cells of table 310 are first updated, S9, by elements "falling" from cells above the empty cells, where the remaining empty cells then will be updated by the newly generated elements. The updated table 320 is then in accordance to the present disclosure displayed at the display screen of the client device 106, by means of the server 102 controlling, S10, the client device 106.

As is shown in FIG. 3C, a new cluster 322 has formed within the updated table 320. The server 102 may then again and in an automated manner determine a second gaming outcome to be communicated to the client device 106. As may be seen in FIG. 3C, the cluster 322 comprises six matching elements.

In an alternative embodiment of the present disclosure and as shown in FIG. 3D, instead of applying the above-mentioned gravity functionality, the server 102 will instead directly update the table 330 with newly generated elements at the empty cells as was illustrated in FIG. 3B. Also here a cluster 332 has been formed, however here the cluster does not just comprising matching elements, but the cluster 332 is formed because of the inclusion of a generic element that is matchable to all different types of elements. In the illustration shown in FIG. 3D, the generic element is in the form of a "star". The generic element may in some embodiments be defined as a "wild card" of a "joker" element. As is shown in FIG. 3D, the generic element provides a "bridge" between matching elements, here shown as "aces". In some embodiments the inclusion of a generic element with the cluster may be a prerequisite for performing the step of updating the table with newly generated elements, as has previously been discussed above.

In summary, the present disclosure relates to a computer implemented method performed by a gaming system, the gaming system comprising a server arranged in communication with an electronic user device using a network connection, the electronic user device comprising a display screen, wherein the method comprises the steps of forming, at the server, a table having a predetermined dimension and comprising a corresponding number of cells, generating, at the server, a first set of elements corresponding to the cells of the table, populating, at the server, the cells of the table with the first set of elements, directing, using the server, the electronic user device to display the table at the display screen, identifying, at the server, a cluster of cells of the table being populated with matching elements, determining, at the server, a first gaming outcome by applying a predefined matching scheme to match the identified cluster with a plurality of predefined cluster formations, directing, using the server, the electronic user device to display the gaming outcome at the display screen, identifying, at the server, further matching elements within the table, updating, at the server, positions of the table where the matching elements of the cluster and the further matching elements are located with a second set of elements generated at the server, and in response to the second set of elements being introduced in the table directing, using the server, the electronic user device to display the updated table.

Generally, when the operational scheme according to the present disclosure is applied to a game provided by the server, it may be possible to increase the randomization of the game, thus potentially allowing for increasing winning possibilities for a player participating in the game. An advantage following such a possibility is an improved attraction power to the game, thus potentially allowing for the player to remain playing the game for an increased duration as compared to previously known similar operational schemes.

In addition, the control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed present disclosure, from a study of the drawings, the disclosure, and the appended claims. The person skilled in the art realizes that the present disclosure is not limited to the preferred embodiments.

The invention claimed is:

1. A computer implemented method performed by a gaming system, the gaming system comprising a server arranged in communication with an electronic user device using a network connection, the electronic user device comprising a display screen, wherein the method comprises:
   forming, at the server, a table having predetermined dimensions and comprising a corresponding number of cells,
   generating, at the server, a first set of elements corresponding to the cells of the table, wherein each generated element is of a type and the type of element is one of a plurality of predefined element types, and wherein the plurality of element types comprises a generic type that is matchable to each of the plurality of predefined element types,
   populating, at the server, the cells of the table with the first set of elements,
   directing, using the server, the electronic user device to display the table on the display screen,
   identifying, at the server, a cluster of cells of the table being populated with matching elements,
   determining, at the server, a first gaming outcome by applying a predefined matching scheme to match the identified cluster with a plurality of predefined cluster formations,
   directing, using the server, the electronic user device to display the first gaming outcome on the display screen,
   identifying, at the server, further matching elements within the table,
   updating, at the server, positions of the table where the matching elements of the cluster and the further matching elements are located with a second set of elements generated at the server, wherein the updating is only performed if the cluster comprises an element of the generic type, and
   in response to the second set of elements being introduced in the table directing, using the server, the electronic user device to display the updated table.

2. The method according to claim 1, further comprising:
   receiving, at the server, a bet from the electronic user device, wherein the determination of the first gaming outcome further dependent on the bet.

3. The method according to claim 1, wherein the electronic user device is adapted to present a graphical user interface (GUI) on the display screen, and the method further comprises:
   forming, at the server, a graphical representation of at least one of the table, the gaming outcome and the updated table, and
   distributing, from the server to the electronic user device, the graphical representation.

4. The method according to claim 1, wherein at least one of the predetermined dimensions of the table and the predefined element types is selected based on a type of game being executed at the server.

5. The method according to claim 4, wherein the type of game is a game of chance.

6. A gaming system comprising a server arranged in communication with an electronic user device using a network connection, the electronic user device comprising a display screen, wherein the server is adapted to:
   form a table having predetermined dimensions and comprising a corresponding number of cells,
   generate a first set of elements corresponding to the cells of the table, wherein each generated element is of a type and the type of element is one of a plurality of predefined element types, and wherein the plurality of element types comprises a generic type that is matchable to each of the plurality of predefined element types,
   populate the cells of the table with the first set of elements,
   direct the electronic user device to display the table on the display screen,
   identify a cluster of cells of the table being populated with matching elements,
   determine a first gaming outcome by applying a predefined matching scheme to match the identified cluster with a plurality of predefined cluster formations,
   direct the electronic user device to display the first gaming outcome on the display screen,
   identify further matching elements within the table,
   update positions of the table where the matching elements of the cluster and the further matching elements are located with a second set of elements generated at the server, wherein the updating is only performed if the cluster comprises an element of the generic type, and
   in response to the second set of elements being introduced in the table direct the electronic user device to display the updated table.

7. The gaming system according to claim 6, wherein the server is further adapted to:
   receive a bet from the electronic user device,
   wherein the determination of the first gaming outcome further dependent on the bet.

8. The gaming system according to claim 6, wherein the electronic user device is adapted to present a graphical user interface (GUI) on the display screen, and the server is further adapted to:
   form a graphical representation of at least one of the table, the gaming outcome and the updated table, and
   distribute the graphical representation to the electronic user device.

9. The gaming system according to claim 6, wherein at least one of the predetermined dimensions of the table and the predefined element types is selected based on a type of game being executed at the server.

10. The gaming system according to claim 9, wherein the type of game is a game of chance.

11. A computer program product comprising a non-transitory computer readable medium having stored thereon computer program means for operating a gaming system, the gaming system comprising a server arranged in communication with an electronic user device using a network connection, the electronic user device comprising a display screen, wherein the computer program product comprises:
   code for forming, at the server, a table having predetermined dimensions and comprising a corresponding number of cells,
   code for generating, at the server, a first set of elements corresponding to the cells of the table, wherein each generated element is of a type and the type of element is one of a plurality of predefined element types, and wherein the plurality of element types comprises a generic type that is matchable to each of the plurality of predefined element types,
   code for populating, at the server, the cells of the table with the first set of elements, code for directing, using the server, the electronic user device to display the table at the display screen, code for identifying, at the server, a cluster of cells of the table being populated with matching elements, code for determining, at the server, a first gaming outcome by applying a predefined matching scheme to match the identified cluster with a plurality of predefined cluster formations, code for directing, using the server, the electronic user device to display the first gaming outcome on the display screen, code for identifying, at the server, further matching elements within the table, code for updating, at the server, positions of the table where the matching elements of the cluster and the further matching elements are located with a second set of elements generated at the server, wherein the updating is only performed if the cluster comprises an element of the generic type, and code for in response to the second set of elements being introduced in the table directing, using the server, the electronic user device to display the updated table.

\* \* \* \* \*